United States Patent [19]

Merriam

[11] 3,958,032
[45] May 18, 1976

[54] METHOD OF PUFFING MOIST FOOD PRODUCTS USING BOTH INERT NON-CONDENSIBLE GAS AND VAPORIZED MOISTURE

[75] Inventor: Charles J. Merriam, Chicago, Ill.

[73] Assignee: The Griffith Laboratories, Inc., Chicago, Ill.

[22] Filed: Feb. 3, 1975

[21] Appl. No.: 546,428

[52] U.S. Cl.............................. 426/580; 426/506; 426/625; 426/629; 426/634; 426/656; 426/802
[51] Int. Cl.² ............................................ A23J 3/00
[58] Field of Search .......... 426/506, 580, 625, 629, 426/634, 656, 802

[56] References Cited
UNITED STATES PATENTS

| | | | |
|---|---|---|---|
| 3,488,770 | 1/1970 | Atkinson............................ | 426/104 |
| 3,852,492 | 12/1974 | Brown................................ | 426/364 |
| 3,904,769 | 9/1975 | Sair et al............................ | 426/104 |

*Primary Examiner*—James R. Hoffman
*Attorney, Agent, or Firm*—Merriam, Marshall, Shapiro & Klose

[57] ABSTRACT

The improvement in the method of controlling the restricted puffing of moist, puffable food products, usually proteinaceous, so as to avoid the significant rupturing or disruptive puffing characteristics associated with so-called explosion-puffed extrudates. That improvement involves, for example, deliberately including in a water-moistened, viscous proteinaceous mass during its passage through and from the confines of an elongated, open-ended die, a relatively small amount of occluded air mixed therewith in controlled quantity so that puffing or, more specifically, balloon-puffing, is accomplished without requiring substantial or significant boiling of water in the mass. This results from controllably utilizing the partial pressure of the vaporized water combined with the partial pressure of the controlled amount of air contained in the advancing mass.

22 Claims, No Drawings

METHOD OF PUFFING MOIST FOOD PRODUCTS USING BOTH INERT NON-CONDENSIBLE GAS AND VAPORIZED MOISTURE

This invention relates to the controlled puffing of moist, puffable food products, usually proteinaceous, in such a way as to avoid the significant rupturing or disruptive puffing characteristics associated with so-called explosion-puffed extrudates.

In my preferred method of puffing, a hot, water-moistened, viscous, extrudable food material, such as a proteinaceous food material, having at least about 5% by volume, as measured at atmospheric pressure, of an inert non-condensible gas, usually air, is worked under high super-atmospheric pressure to a hot, mixed, water-moistened, viscous, extrudable condition. A column of the hot, water-moistened, viscous, extrudable mass is advanced through an open-ended die at a temperature selectively near but below the normal atmospheric boiling point of water while reducing the pressure to substantially atmospheric so that contained air expands significantly within the mass and contained water vaporizes within the mass to a significant but controlled extent to add its vapor pressure to the partial pressure of air within the die-confined, advancing mass. The mass is extruded from the die at substantially atmospheric pressure to provide a puffed food product while obviating the explosive disruption thereof.

The term "inert non-condensible gas", as used herein, refers to gaseous material which does not chemically react to any appreciable or significant extent with the food material with which it comes into contact and which exists in the gaseous phase under the temperature and pressure conditions which prevail during extrusion. The inert non-condensible gas provides gradual or controlled puffing by reason of the gas adding its partial pressure to that of vaporized moisture formed below its applicable boiling point. The preferred inert non-condensible gas, or the gas usually used, is air, although, if desired, other suitable gases can be used.

In explosion-puffing, the food product, in the presence of contained moisture, is heated in an extruder to well above the normal boiling point of available water, but under extrusion pressure conditions that prevent water from boiling from the confined material. The moisture is then rapidly flashed-off by the sudden release of pressure as the material emerges from the die orifice of the extruder, to abruptly explosion-puff the extrudate.

My method, referred to herein as "balloon-puffing", involves producing a major or substantial part of the expansion by vaporizing water contained in the viscous proteinaceous plastic mass or melt below its applicable boiling point in the deliberate presence of residual air in sufficient quantity to produce gradual or controlled puffing by reason of the air adding its partial pressure to that of the vaporized moisture. Small bubbles present or so generated within the advancing mass generally develop and grow along the path or direction of flow and against the positive confining pressure exerted by an elongated die.

When various proteinaceous food materials are subjected to the method of the invention, the puffed food products are textured to provide enhanced "bite" characteristics in the mouth.

The preferred edible fibrous proteinaceous extrudate made in accordance with the invention has meat-like structure and organized balloon-puffed cells and is characterized by having good water absorption properties and by retaining its structural integrity under retorting conditions. The balloon-puffed cells preferably are arranged in substantially coaxially defined, laminar layers. The structured or textured extrudate may have a specific density of at least about 25 or 30 lbs./ft.$^3$ (as determined with fine sea sand as described in copending Sair-Quass Ser. No. 469,940, filed May 15, 1974, mentioned below).

My method includes the step of vaporizing available water in the advancing hot, moist proteinaceous mass or melt at a temperature below its boiling point in the presence of small bubbles of air (macroscopic and/or microscopic in size) distributed within the mass, to produce controlled expansion and balloon-puffing of the product. The water vapor is formed without requiring that the water boil, and contributes substantially to the increase in size of the air bubbles.

Copending U.S. application Ser. No. 469,940 of Louis Sair and Donald W. Quass, filed May 15, 1974, relates to balloon-puffed, structured proteinaceous products having stream-induced cells formed within a mass (e.g., proteinaceous melt or extrudate) by gradual or restricted expansion without significantly rupturing or disrupting the mass or foraminous wall structure as occurs in explosion-puffing. That application, however, neither mentions nor excludes the augmenting of such generation of steam-induced cells or the incipient development thereof by means other than steam alone.

The term balloon-puffing, as used herein as well as in that Sair-Quass application, refers to the forming of cells within a mass (e.g., viscous proteinaceous melt or extrudate) by gradual or restricted expansion without significantly rupturing or disrupting the mass or walls as occurs in explosion-puffing. Balloon-puffing may be initiated within the die and may be continued upon or after emergence of the viscous proteinaceous mass (e.g., extrudate) from the die.

As used in describing my invention herein, the term "steam" refers to the gaseous product produced when water is vaporized at its boiling point under the existing pressure conditions, while the gaseous product produced by the vaporization of water at a temperature below its boiling point is referred to as water vapor.

The invention of that copending Sair-Quass application yields distinctive and superior texturized products which are particularly suitable for use as foods or food supplements or extenders. The preferred products thereof are tissue-like or meat-like and have an unusually strong, fibrous wall structure, and are characterised by good and rapid water absorption properties under boiling and/or retorting conditions such as used in food processing or preparation, while retaining desirable structure, texture and chewability.

The composition of the feed stock or protein mix (as well as apparatus and processing conditions) used in the preferred method of said Sair-Quass application at least in part determines the particular temperature and/or pressure conditions applied to the die assembly and confined, moist mass. In most instances, the moist, advancing plastic mass is or must be heated above the normal boiling point of water (i.e., 212°F. at sea level) to form a substantially homogeneous, glassy plastic melt, and is therefore subjected to controlled cooling before emerging from the effectively remote discharge tip of the elongated die. In other instances, where the moist feed stock forms such a plastic melt below about 212°F. (e.g., at about 180°F.), controlled heating may be required.

My improvement over the methods of the Sair-Quass application concerns deliberately including in the water-moistened, viscous proteinaceous melt or matrix before it enters the open-ended elongated die, a relatively small amount of air in controlled quantity so that balloon-puffing can be accomplished without requiring substantial or significant boiling of water in the mass. This is accomplished by utilizing the partial pressure of confined, generated water vapor combined with the partial pressure of the confined, controlled amount of air present in the advancing viscous plastic mass. It is preferred to incorporate at least about 5% by volume of air and, under some conditions, as much as 30% by volume of air in the extrudate (as measured at atmospheric pressure). Furthermore, it is preferred to introduce continuously a controllable or predetermined amount of air (preheated or at ambient temperature) into the advancing feed mix before the hot, moist, viscous, plastic proteinaceous mass or melt is completely formed.

In my method, the moist proteinaceous feed mix or protein mix may be converted to a viscous, glassy plastic melt under substantial physical pressure at temperatures of about 180°F. or more, as required. The inclusion of small air bubbles within the melt permits water vapor to be formed within the confined mass without requiring that any substantial amount of water be boiled and such generated water vapor substantially or significantly increases the size of the air bubbles.

The incorporation of air in the form of bubbles distributed in the advancing melt or extrudate permits puffing, namely, balloon-puffing, to occur in a gradual or controlled manner so that controlled expansion occurs without significantly rupturing or disrupting the mass or walls and at a temperature below that at which water boils at the prevailing pressure. In the absence of air in the confined, advancing viscous mass, water vapor would not be formed at such prevailing temperature-pressure conditions, and hence puffing would not occur or result; the contained or incorporated air serves as a gas phase into which water can evaporate or volatize without substantial boiling, thus tending to increase the size of the air bubbles within the advancing mass by reason of the additive pressure of the water vapor, without the undesired and detrimental effects of explosion-puffing. Accordingly, the air bubbles initially formed provide nuclei for forming larger, balloon-puffed cells or bubbles within the extrudate.

My method contemplates, for example, that at least about ½ or ⅔ the size of the enlarged bubbles be due to the vapor pressure of water vapor contained therein. Furthermore, the vapor pressure of water vapor contained within the proteinaceous mass during extrusion may be, for example, from about 9 to about 14 psi.

With my method, puffing may be conducted at somewhat lower extrusion temperatures, thereby providing, among other things, means of avoiding any burnt taste which might otherwise be present with some proteinaceous materials.

The advantages of my process become more striking where the pressure during extrusion through and from the elongated, open-ended die assembly changes from a very high initial pressure to a low pressure that is in the vicinity of that of the discharge zone. To give an example, if the percentage by volume of air in the feed mix is 10% (as measured at atmospheric pressure), and the pressure is raised to 100 atmospheres at an initial, upstream portion of the elongated die assembly, the air will occupy approximately 0.1% of the total volume of that material. This, of course, will be modified by any change in temperature which may occur, but the effect of any such change is minor and ignored in the present examples. If the pressure then is reduced to atmospheric before or upon emergence of the extrudate from the die opening (across the die orifice), the air will again return to 10% by volume of the mass, which means that there will be a hundredfold expansion in the size of the air bubbles. This expansion, of course, has a cooling effect on the mass and has, of itself, some beneficial effect upon the avoidance of disruptive explosion-puffing. Thus, expansion of the contained air from 0.10% by volume to 10% by volume will cool the surrounding matrix; and, if the extrusion temperature is properly selected, the drop in temperature can be sufficient to cool the matrix to a temperature at which explosion-puffing is avoided.

In this connection, it should be realized that the boiling or vaporizing of 1% by weight of water from a proteinaceous mass will generate a total volume on the order of about 17 times the volume of the original proteinaceous mass and will cool the material by some 20°F. The expansion of contained air from 0.1% to 10% by volume, therefore, is quite minor when compared to the potentially disruptive effect of water boiling. The cooling effect of air expansion is likewise minor when compared to the cooling effect obtained by evaporating water from the material.

The expansion of air, however, is magnified very greatly as a result of the partial pressure of water vapor in the air bubbles. For example, if the proteinaceous mass is at atmospheric pressure (about 15 psi.) and a temperature of 202°F. (at which temperature the vapor pressure of water is about 12 psi.), water will tend to vaporize into the air bubbles until equilibrium is established (with the air having a partial pressure of about 3 psi. and the water vapor having a partial pressure of about 12 psi.). This, of course, means that the air bubbles will expand to about 5 times their original size. Assuming equilibrium is reached, the total volume of the distributed air bubbles, which would otherwise by 10% of the volume of the moist proteinaceous mass, would be approximately 35% thereof (90 parts by volume of moist proteinaceous material and 50 parts by volume of moisture-laden air).

Normally, equilibrium is not reached in the short time available in an extrusion process, in part because of the interfering effect of the air on the rate of vaporization of available water. Further, the evaporation of available water cools the developed material or matrix to the same extent as would the boiling of the same amount of water. Accordingly, the actual volume increase in an actual extrusion process will be less than the maximum theoretical amount.

The actual reduction in the expansion resulting from the cooling effect of the vaporization of water would not be substantial, however, since the amount of water vaporized represents only a small percentage of the weight of the proteinaceous mass. In the above example, the weight of vaporized water would be less han 0.02% of the total weight of the moist proteinaceous mass, and the evaporation of this amount of water should cool the extrudate by less than about 0.5°F. Thus, the temperature drop due to vaporization would have no substantial inhibiting effect on the reaching of equilibrium.

Maximum expansion of the melt will occur only if the vaporization of water proceeds essentially to equilibrium, but even if the vaporization actually goes only to one-third theoretical, such vaporization provides an additional impulse to puffing, which is significant. Furthermore, since the bubbles generated as a result of balloon-puffing at least in part contain air, any tendency for the extrusion-induced or extrusion-generated cells to collapse upon condensation of contained water vapor in the cells or bubbles is significantly reduced.

The amount of air to be used or introduced into the hot, moist, viscous, plastic proteinaceous mass or melt depends upon a number of factors, the following of which are considered to be particularly important:

a. the amount of balloon-puffing necessary to achieve a desired density;
b. the extrusion temperature(s) and temperature(s) at which balloon-puffing is induced or occurs;
c. the pressure of the environment into which the extrudate emerges from the remote die opening (e.g., atmospheric or ambient pressure); and,
d. the pressure at the inlet of the die assembly or the initial pressure of or in the confined mass present in such upstream portion.

The extent of balloon-puffing is affected significantly by the temperature at which puffing occurs. If balloon-puffing is conducted, for example, at 202°F., at which temperature the vapor pressure of water is approximately 12 psi., and assuming that the discharge zone or environment is at atmospheric pressure (about 15 psi.), the total expansion induced after vaporization of water into the minute or small air pockets may approach above five times the volume of the air introduced, since the air and water vapor will be at equilibrium when the partial pressure of air is 3 psi. and the partial pressure of water vapor is 12 psi. On the other hand, assuming the same atmospheric pressure, if the puffing temperature is increased to about 209°F., at which temperature the vapor pressure of water is about 14 psi., the potential expansion available after vaporization of water is about fifteenfold the volume of the air.

Inasmuch as the degree of puffing desired reduces the density of the resulting balloon-puffed extrudate by about 25 to 75%, the above listed and discussed factors [i.e., (a)-(d)] should be adjusted or correlated to bring about such a result.

It should be appreciated that the inclusion of air in the advancing melt may have a significant effect on the extent of balloon-puffing, even without the additional expansion due to the presence of water vapor. Thus, for example, if the pressure at an inlet portion of the die assembly is 100 atmospheres and the amount of air in the moist proteinaceous material is 20% by volume (as determined at atmospheric pressure), the contained air will be reduced to about 0.2% by volume at the inlet or upstream portion of the die assembly, but at the remote outlet of the die will return to approximately 20% by volume, thus constituting a puffing impulse or puffing means even without the additional or augmenting puffing attributable to water vapor.

The proteinaceous source material used in the protein mix or feed stock used in my method may include, for example, edible protein-containing material of a desired size or form as vegetable or cereal grain protein materials (e.g., wheat gluten or rice gluten) or defatted or solvent-extracted vegetable oil seed, oleaginous, or cotyledon seed materials (e.g., solvent-extracted soybean protein meal), or combinations thereof, having a protein content (dry weight basis) of about 30% or more, preferably about 40%, 50%, or more. Soy protein concentrates having about 70% protein (dry weight basis) may be used, for example, and such concentrates may have a low or high nitrogen solubility index (i.e., NSI). Furthermore, if desired, soy protein isolate having a protein content of about 90% or more on a dry weight basis, or commercial casein may be used.

The proteinaceous material used may or may not be in an at least partially neutralized form.

When one wishes to produce a particularly bland, structured proteinaceous product, the proteinaceous material used in the protein mix desirably should have a high protein content. Thus, when defatted soy protein material is used, it is generally desirable to use a bland, neutralized concentrate substantially free of beany or bitter taste-conferring material, such as may be produced in accordance with U.S. Pat. No. 2,881,076 to Sair.

Accordingly, the protein mix may include at least about 30%, 40%, 50%, or more, by weight on a dry basis of proteinaceous material selected from the group consisting of solvent-extracted vegetable oil seed, cereal grain, casein, and admixtures thereof.

If desired, the protein mix may include or be used with a desired edible amount of cereals, starch, binders, cane sugar, dextrose, vitamins, coloring agents, seasonings or flavoring agents, hydrolyzates, nutrients, or the like, although such special additives are not necessary or essential. Those additives may be present with the proteinaceous material when the protein mix is fed to the extruder assembly, or may be added, as desired, after completion of extrusion.

When special additives are employed, the protein content of the feed stock or protein mix may be varied (e.g., from about 30% to about 75%) as desired. For some purposes, one may prefer to produce expanded proteinaceous products having about 50% or more by weight protein on a dry weight basis.

For some purposes, one may desire to include an edible form of available calcium (e.g., calcium ions) in or with the proteinaceous material (e.g., before the protein mix is converted to a viscous melt) for the purpose of imparting a still sturdier structure (e.g., skeleton-like structure) and enhanced textural characteristics to the product. The resulting product, accordingly, can attain a still greater degree of texture, firmness, or chewiness, as demonstrated when the product is later subjected to hydration or rehydration under cooking or retorting conditions.

Small amounts of calcium (e.g., about 2% by weight calcium salt based on the weight of the protein ingredient) may be incorporated into or used with the protein mix in the form of an edible calcium salt, such as dicalcium phosphate dihydrate, calcium chloride, or the like, without imparting an undesired flavor to the product. Calcium tends to enhance the hydrated or rehydrated texture of the product, but also tends to cause some loss of water absorption properties. However, structural integrity can be obtained without using calcium or other special additives.

By increasing the pH of the protein mix with alkaline material such as trisodium phosphate, one may enhance the hydration properties of the product, subject generally to some reduction in texture.

The protein mix should be in a substantially uniform, moist state and have an effective amount of water and occluded air (e.g., microvoids) when or as it is subjected to effective mechanical pressure, heat and shearing action to convert it to a melt (e.g., a substantially homogeneous, moist, viscous plastic melt).

The nature or composition of the feed stock and melt (as well as apparatus and processing conditions) at least in part determine the particular temperatures and/or pressure conditions applied to the die assembly and confined, advancing mass or melt.

When one uses, for example, appropriate amounts of proteinaceous material such as defatted soy protein (e.g., flakes or flour) in the feed stock and the feed stock is at least in part moistened with or includes water (e.g., moist, crumbly or non-fluid protein mix), a viscous but pressureflowable hot melt may be produced or formed, for example, at product temperatures of well above 212°F. (e.g., under initially great pressure).

However, if one uses, for example, appropriate amounts of proteinaceous material such as casein or defatted soy protein isolate in the feed stock and feed stock is moistened with water, a viscous but pressureflowable hot melt may be produced or formed, for example, at product temperatures of below about 212°F. (e.g., at about 180°F., or more).

The amount of water present in the feed stock during the application of mechanical pressure and mechanical working (e.g., shearing) and heat sufficient to convert the feed stock to a hot viscous mass (e.g., plastic melt), the nature of the feed stock material and other desired, added materials which may be blended therewith, and the conditions of temperature-pressure control, pH, mechanical pressure, shearing action, forming, and flow rate, and the nature of the particular type of equipment and processing conditions used, are all interrelated and should be coordinated. Thus, when one operating or processing condition is varied or selected, that variation or selection, in turn, may, and often does, influence other operating or processing conditions.

The amount of available water generally should be within the range of about 10% to about 45% by weight, and for some purposes, preferably within the range of about 20% to about 35% by weight, based on the weight of the total moist feed stock or moist protein mix. It is desired not to include so much water as to destroy the integrity of the advancing viscous column. The proteinaceous material(s) used to make up the protein mix may have, for example, as much as about 5% to 15% moisture in the commercial form and, accordingly, only a limited amount of water need be added. Water provides the source for the autogeneous generation of water vapor. The amount of water required to be vaporized is relatively small.

The proteinaceous product, as extruded, has a glassy skin and a three-dimensional network structure characterized by disulfide bonding and remaining significantly intact following retorting. The network structure preferably has sufficient cross-linking for the product to be considered as having a polymeric network akin to a vulcanized product.

A variety of injection molding machines and thermoplastic extrusion and compression molding machines or related equipment may be used, at least in part, in preparing, forming and extruding the hot melt or matrix. One can advantageously use, for example, an extruder having a rotatable screw (e.g., a compression or transfer screw) within a closed, heatable, as well as coolable, barrel, and an elongated temperature-pressure controllable die assembly [e.g., appropriately connected to or at the front (outlet) end of the extruder barrel]; and, in some instances, the extruder barrel and rotary screw together define a die assembly.

The apparatus should provide means which presses or urges the confined, plastic melt as a column through and from a length of a die while controlling the temperature-pressure relationship of the melt or matrix.

With many, if not most, proteinaceous materials, it is necessary to control (e.g., adjust or reduce) the temperature of the hot plastic melt or matrix by using appropriate positive (i.e., non-adiabatic) temperature control means in the desired region(s) of the die assembly. The die assembly may be cooled or heated, or both, and may include a jacket, partial jacket, or tubes through which cooling (e.g., water) or heating (e.g., steam) fluid may be circulated, as desired or necessary.

With such an extruder assembly, the feed material may be pre-mixed or blended and charged into the feed inlet (e.g., hopper) of the barrel of the extruder. Some or all of the water may be present in the feed stock which is charged into the extruder, or, if desired, later added in the extruder.

The rotating screw feeds material to and through the extruder assembly, including the die, at an appropriate flow rate and under appropriate flow conditions. The material may pass, for example, through a temperature controllable die adapter having a restrictive (e.g., funnel-shaped) passageway through which material is forced. Such die adapters lead to an elongated die. The outer diameter of the screw may be greater than the outlet of the die adapter, so that material builds up at the die adapter under substantial pressure. The build-up of material fed to and through the die adapter (e.g., by a rotating screw) may produce the required pressure, for example, from about 450 psig. to about 1,000 psig., as determined by a pressure gauge positioned at the passageway of the die adapter, and the temperature of the die adapter must be sufficiently high so as to provide a uniform glassy melt (e.g, at least about 180°F.), and may be, for example, about 115°C. or more (about 239°F. or more), as determined by a thermocouple positioned near the passageway of the die adapter. The die forms and shapes the melt which, preferably, forms a column, and, by proper temperature-pressure control and control of the occluded air, forms a baloon-puffed extrudate. The edible proteinaceous extrudate may be termed as having been cooked, although that extrudate generally is later, further cooked as desired and as a separate processing step.

The cross-sectional area(s) and shape, as well as the length, of the die may vary, as desired or required, such as to impart to the product a circular, oval, rectangular, or annular cross-section. Dies, for example, from about 10 inches to about 24 inches in length may be used for forming solid, non-spirally shaped columns. The cross-sectional inner diameter of such dies, for example, may be from about ⅜ inch to about ¾ inch, and the die may be shaped to provide a rectangular die orifice having internal dimensions of about ¼ inch high and about ½ inch wide.

The extruder assembly may include, for example, a laboratory Brabender, a Prodex or an Egan extruder (see said copending Sair-Quass application) connected to an appropriate die adapter and elongated die, and having appropriate associated temperature-pressure controls and air inlet means.

Satisfactory results may be obtained with an extruder assembly which includes a Sterling extruder which forms a solid, spirally-shaped column (see said copending Sair-Quass application). The stationary outer die wall and rotary screw of such Sterling extruder assembly, as shown and described in said copending Sair-Quass application (a Model 5000, 4½ inch extruder having a L/D ratio of 24:1; an elongated, medium, 3:1 compression screw having 4 feeding flights, 2 transition flights and 18 metering flights, and flat flight tips which are contiguous to the outer, stationary die wall, the clearance being about 0.003 inch; and, a 150 HP motor which rotates the screw), together form, in effect, an annular die adapter followed by a communicating annular forming or shaping die. (If desired, that extruder assembly may be fitted, at its discharge end, with a separate, temperature controlled die assembly or die extension having stationary die walls; such separate die assembly may shape the hot melt into an annular form.)

For example, one may use extrusion apparatus for forming balloon-puffed proteinaceous products from feed stock having water-moistened proteinaceous material, which apparatus includes:

a. Elongated, tubular housing means which, at least in part, provide operatively connected feed inlet means through which proteinaceous material as feed stock is fed, and elongated die means having a confined passageway with an effectively remote open outlet end;

b. Power-driven, rotatable, elongated, screw feed means positioned within at least a portion of the length of the housing means and operatively associated with feed inlet means, said screw feed means being constructed to urge the advancement of confined, water-moistened proteinaceous material in the housing means to the die means at a predetermined rate of advancement while physically working it;

c. Controllable air inlet means for deliberately introducing a predetermined amount of air into the water-moistened proteinaceous material, preferably before it is completely converted into a column of a hot, glassy, viscous plastic melt, said air forming or providing air bubbles distributed in the confined, advancing column of melt;

d. Heating means operatively associated with the housing means to heat an upstream portion of the confined, advancing, worked proteinaceous material to form a column of a hot, glassy, viscous plastic melt under great physical pressure having a controlled amount of occluded air which is present as small distributed air bubbles and at a maintained melt temperature of about 180°F. or more;

e. Positive cooling means operatively associated with the die means to control and lower the temperature (while the pressure is reduced) of a downstream portion of the confined, advancing, hot viscous melt; and, f. Said air inlet means, heating means, cooling means, and die means being operatively associated and correlated to provide a pressure-temperature-viscosity-contained air relationship of the confined, advancing column of melt at the open end of the die to produce balloon-puffing while avoiding significant disruption of the product.

The balloon-puffing referred to in part (f), above, is initiated by the formation or presence of small air bubbles (e.g., present as microvoids or microscopic air pockets) within the confined, advancing melt, which bubbles are substantially increased in size by the reduction of pressure of or in the confined, advancing melt, without requiring the substantial or significant boiling of contained available water. The extrusion pressure is reduced, at least in part, due to the frictional resistance of the column of viscous plastic mass to advancement through the elongated die. The combination of the partial pressures of air and water vapor within cells induced or present within the advancing mass is controlled, whereby the total pressure within the bubbles distributed within the mass extruded from the die opening is not significantly greater than the ambient pressure (pressure of the discharge zone). The extruded material may emerge into the atmosphere.

Regardless of the particular extruder assembly used, a desired amount of air must be present in the proteinaceous feed stock, desirably before it is converted into a column of hot, glassy, viscous plastic melt. This may be done, for example, by directing a predetermined amount of air into the feed stock before or while it is compacted within the extruder barrel. One may, for example, use an extruder barrel having a controllable air nozzle which injects air into the moist proteinaceous mass at a point (e.g., at or near the metering flights of the rotating screw) immediately before it forms a uniform glassy melt. If desired, a plurality of such nozzles may be used.

When the inert non-condensible gas is introduced into the feed stock in such manner, one does not rely on the in situ generation of gas (e.g., as a result of decomposition or a chemical reaction) under the conditions used for extrusion.

The extruded products may be sized, dried, and/or frozen, as desired.

The sizing operation reduces the extrudate to the desired size and form of subdivision, and may involve cutting or shaping the product into chunks, granules, beads or the like. This may be done as or shortly before the extrudate emerges from the die orifice, or after collection of the extrudate. The emerging product retains enough water and heat to facilitate sizing without rupturing the product or producing much fines. For many purposes, the size product should have a surface area (specific or bulk surface area) to volume (specific or bulk volume) ratio sufficient to provide good moisture penetration and/or rapid rate of hydration or rehydration (e.g., throughout the product).

The product, either sized or unsized, may be dried by conventional means to a desired moisture content (e.g., 5–15%). Drying may be conducted in any suitable manner.

If desired, the product may be chilled or frozen for storage and preservation purposes, and later sliced (e.g., with a bacon slicer) or cut to the desired shape or size, and thawed. Moreover, the moist extrudate may be frozen (without prior drying) and may be sized before or after being frozen, as desired.

My proteinaceous extrudates may have a protein content of at least 30% (e.g., about 40%, 45%, 50%, 55%, or even more) on a dry weight basis. If desired, they must be substantially or essentially free of non-proteinaceous fillers or binders.

The descriptive portion of said copending Sair-Quass application (including the tests and procedures therein specified for determining density, water absorption capacity, and structural integrity of a retorted product, as well as a product subjected to boiling water) is hereby expressly incorporated herein by reference thereto, particularly for purposes of illustrating balloon-puffing under the conditions described therein.

The forms of my invention herein shown and described are to be considered only as illustrative. It will be apparent to those skilled in the art that numerous modifications may be made without departure from the spirit of the invention or the scope of the appended claims.

I claim:

1. The method of puffing hot, water-moistened, viscous, extrudable food materials comprising: working a mass of water-moistened food material having at least about 5% by volume of air, as measured at atmospheric pressure, under high super-atmospheric pressure and sufficient heat to a hot, mixed, water-moistened, viscous, extrudable condition; advancing a column of said hot, water-moistened, viscous, extrudable mass through a die at a temperature selectively near but below 212°F., while reducing the pressure to substantially atmospheric so that contained air expands significantly within the mass and contained water vaporizes within the mass to a significant but controlled extent to add its vapor pressure to the partial pressure of air within the die-confined, advancing mass; and, extruding the mass from the die at substantially atmospheric pressure to provide a puffed food product.

2. The method of claim 1, wherein said food material has more than 40% by weight protein on a dry weight basis, and said hot, water-moistened, viscous, extrudable mass is a substantially homogeneous, plastic proteinaceous melt.

3. In the method of restrictively expanding moist proteinaceous material by working water-moistened proteinaceous material under substantial mechanical pressure with heat sufficient to convert it to a column of hot, moist, viscous plastic mass and extruding said mass through and from an elongated die under controlled balloon-puffing conditions, the improvement comprising providing at least about 5% of volume of occluded air, as measured at atmospheric pressure, in said viscous plastic mass, and vaporizing available water contained in said advancing mass at a controlled temperature below its applicable boiling point in the presence of small bubbles of air distributed within the mass to contribute substantially to an increase in the size of said bubbles of air, thereby producing a balloon-puffed proteinaceous extrudate while avoiding significant disruption of the product.

4. The method of claim 3, wherein said porteinaceous material includes a material having a protein content of at least about 30% by weight on a dry basis and selected from the group consisting of (a) solvent-extracted vegetable oil seed, (b) cereal grain, (c) casein, and (d) admixtures thereof.

5. The method of claim 3, wherein at least about ½ of the size of the enlarged bubbles is due to the vapor pressure of water vapor contained therein.

6. The method of claim 3, wherein at least about ⅔ of the size of the enlarged bubbles results from the vapor pressure of water vapor contained therein.

7. The method of claim 3, wherein the vapor pressure of water vapor contained within the proteinaceous mass during extrusion is from about 9 to about 14 psi.

8. The method of claim 3, wherein said proteinaceous material includes soy protein having a protein content of at least about 40% by weight on a dry weight basis.

9. In the method of restrictively expanding moist proteinaceous material by working water-moistened proteinaceous material under substantial mechanical pressure with heat sufficient to convert it to a hot, moist, viscous plastic mass and extruding said mass through and from an elongated die under controlled balloon-puffing conditions, the improvement comprising providing a relatively small amount of occluded air in controlled quantity in said water-moistened, viscous proteinaceous mass during its passage through and from said die, and controlling the temperature-pressure conditions during said passage to cause water to vaporize into said air at a temperature below the applicable boiling point of contained water under the prevailing pressure conditions, whereby air-water vapor cells are expanded essentially throughout the mass and balloon-puffing results while avoiding significant disruption of the product and without significantly boiling contained water.

10. The method of claim 9, wherein said proteinaceous material includes a material having a protein content of at least about 30% by weight on a dry basis and selected from the group consisting of (a) solvent-extracted vegetable oil seed, (b) cereal grain, (c) casein, and (d) admixtures thereof.

11. In the method of restrictively expanding a hot, water-moistened proteinaceous mass by extruding it, the improvement comprising providing a relatively small amount of occluded non-condensible gas in controlled quantity in said hot, moist proteinaceous mass prior to extrusion through and from a die and controlling the temperature and pressure conditions of the extruded mass to cause water to vaporize into the occluded non-condensible gas at a temperature below the applicable boiling point of contained water, whereby gas-water vapor cells are expanded essentially throughout the mass, and balloon-puffing results, avoiding significant disruption of the product.

12. The method of claim 11, wherein said proteinaceous mass includes a material having a protein content of at least about 30% by weight on a dry basis and selected from the group consisting of (a) solvent-extracted vegetable oil seed, (b) cereal grain, (c) casein, and (d) admixtures thereof.

13. The method of claim 11, wherein said proteinaceous mass includes soy protein having a protein content of at least about 40% by weight on a dry weight basis.

14. The method of claim 11, wherein said non-condensible gas includes air.

15. In the method of restrictively expanding moist throughout material by working water-moistened proteinaceous material under substantial mechanical pressure with heat sufficient to convert it to a hot, moist, viscous plastic mass and extruding said mass through and from a die under controlled balloon-puffing conditions, the improvement comprising producing a major part of the restrictive expansion by vaporizing moisture contained in the viscous plastic mass below its applicable boiling point in the controlled presence of an inert non-condensible gas in sufficient quantity to produce balloon-puffing by reason of gas gas adding its partial pressure to that of the vaporized moisture, whereby gas-water vapor cells are expanded essentially througout the mass and balloon-puffing results.

16. The method of claim 15, wherein said proteinaceous material includes a material having a protein content of at least about 30% by weight on a dry basis and selected from the group consisting of (a) solvent-extracted vegetable oil seed, (b) cereal grain, (c) casein, and (d) admixtures thereof.

17. The method of claim 15, wherein said proteinaceous material includes soy protein having a protein content of at least about 40% by weight on a dry weight basis.

18. The method of claim 15, wherein said inert non-condensible gas includes air.

19. In the method of restrictively expanding moist proteinaceous material by working water-moistened proteinaceous material under mechanical pressure and with heat sufficient to convert it to a hot, moist, viscous plastic mass and extruding said mass through and from a die under controlled balloon-puffing conditions, the improvement comprising providing relatively small amount of occluded non-condensible gas in controlled quantity in said water-moistened, viscous proteinaceous mass during its passage through said die, and controlling the temperature-pressure conditions during said passage to cause water to vaporize into said gas at a temperature below the applicable boiling point of contained water under the prevailing pressure conditions, whereby air-water vapor cells are expanded essentially throughout the mass and balloon-puffing results while avoiding significant disruption of the product.

20. The method of claim 19, wherein said proteinaceous material includes a material having a protein content of at least about 30% by weight on a dry basis and selected from the group consisting of (a) solvent-extracted vegetable oil seed, (b) cereal grain, (c) casein, and (d) admixtures thereof.

21. The method of claim 19, wherein said proteinaceous material includes soy protein having a protein content of at least about 40% by weight on a dry weight basis.

22. The method of claim 19, wherein said non-condensible gas includes air.

* * * * *

UNITED STATES PATENT AND TRADEMARK OFFICE
CERTIFICATE OF CORRECTION

PATENT NO. : 3,958,032
DATED : May 18, 1976
INVENTOR(S) : Charles J. Merriam

It is certified that error appears in the above-identified patent and that said Letters Patent are hereby corrected as shown below:

Column 1, line 65, insert --or texturized-- after "textured"; Column 2, lines 51 and 52, substitute --characterized-- for "characterised"; Column 3, line 59, insert quotation marks around the word "burnt" (i.e., "burnt"); Column 4, line 44, substitute --be-- for "by"; Column 4, line 63, substitute --than-- for "han"; Column 7, line 17, substitute --pressure-flowable-- for "pressureflowable"; Column 7, line 22, before "feed" (second occurrence) insert --the--; Column 7, line 52, delete "autogeneous" and substitute --autogenous--; Column 8, line 48, delete "baloon" and substitute --balloon--; column 11, line 21, delete the comma [,] after "212°F."; column 12, line 55, delete "throughout" and substitute --proteinaceous--; column 12, line 65, delete "gas" (first occurrence) and substitute --said--; column 13, line 19, insert --a-- between "providing" and "relatively".

Signed and Sealed this

Seventeenth Day of August 1976

[SEAL]

Attest:

RUTH C. MASON
Attesting Officer

C. MARSHALL DANN
Commissioner of Patents and Trademarks